United States Patent
Miyazaki et al.

(10) Patent No.: US 12,436,162 B2
(45) Date of Patent: Oct. 7, 2025

(54) AUTOMATIC ANALYZER

(71) Applicant: Hitachi High-Tech Corporation, Tokyo (JP)

(72) Inventors: Masaru Miyazaki, Tokyo (JP); Syotaro Sagawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 537 days.

(21) Appl. No.: 17/796,699

(22) PCT Filed: Jan. 19, 2021

(86) PCT No.: PCT/JP2021/001668
§ 371 (c)(1),
(2) Date: Aug. 1, 2022

(87) PCT Pub. No.: WO2021/166522
PCT Pub. Date: Aug. 26, 2021

(65) Prior Publication Data
US 2023/0059337 A1    Feb. 23, 2023

(30) Foreign Application Priority Data
Feb. 21, 2020   (JP) ................................. 2020-028047

(51) Int. Cl.
*G01N 35/10* (2006.01)
*B01L 3/02* (2006.01)
*G01N 35/04* (2006.01)

(52) U.S. Cl.
CPC ........ *G01N 35/1067* (2013.01); *B01L 3/0227* (2013.01); *G01N 2035/0474* (2013.01); *G01N 2035/1069* (2013.01)

(58) Field of Classification Search
None
See application file for complete search history.

(56) References Cited

U.S. PATENT DOCUMENTS

2006/0062692 A1    3/2006  Tokieda et al.

FOREIGN PATENT DOCUMENTS

| CN | 102967483 A | 3/2013 |
| CN | 203724054 U | 7/2014 |

(Continued)

OTHER PUBLICATIONS

Machine-generated English translation for JP 03-34698Y2 (4 pages) (Year: 1991).*

(Continued)

*Primary Examiner* — P. Kathryn Wright
(74) *Attorney, Agent, or Firm* — Mattingly & Malur, PC

(57) ABSTRACT

An automatic analyzer is provided wherein degree of freedom in arrangement of a dispensing mechanism and of a unit provided below the dispensing mechanism is improved. The automatic analyzer comprising a dispensing mechanism driving a probe for a specimen or a reagent, wherein the automatic analyzer comprises an arm of two degrees of freedom supporting the probe, a first shaft and a second shaft that support the arm and transmit power to the arm, and a motor that gives power allowing the first and second shafts to be rotated and vertically moved, the second shaft being divided in an axial direction and having different diameters and, at the time of lowering the arm by the power of the motor, divided one of the second shaft being housed inside the other, whereby the second shaft is shortened.

7 Claims, 8 Drawing Sheets

(56) References Cited

FOREIGN PATENT DOCUMENTS

| CN | 102967483 B | * | 5/2015 |
|---|---|---|---|
| CN | 105092872 A | | 11/2015 |
| CN | 210005553 U | | 1/2020 |
| JP | 49-131989 U1 | | 11/1974 |
| JP | 0334698 Y2 | * | 7/1991 |
| JP | 5-126835 A | | 5/1993 |
| JP | 6-50981 A | | 2/1994 |
| JP | 6-109744 A | | 4/1994 |
| JP | 10-253638 A | | 9/1998 |
| JP | 2006-84365 A | | 3/2006 |
| JP | 2011-27437 A | | 2/2011 |
| JP | 2014-206381 A | | 10/2014 |

OTHER PUBLICATIONS

Machine-generated English translation for JP 05-126835 (6 pages) (Year: 1993).*
International Search Report of PCT/JP2021/001668 dated Mar. 30, 2021.
Chinese Office Action received in corresponding Chinese Application No. 202180013988.3 dated Jun. 27, 2025.

* cited by examiner

AUTOMATIC ANALYZER

TECHNICAL FIELD

The invention relates to an automatic analyzer.

BACKGROUND ART

A dispensing mechanism of a reagent or a specimen in an automatic analyzer is formed by a probe for sucking and discharging the reagent and the like, an arm for supporting the probe, and a driving mechanism for driving the arm. The probe vertically moves to each stopping position as well as horizontally moves to a suction position and a discharge position of the reagent and the like and a cleaning position where to clean the probe. With a higher-level function of the automatic analyzer, for example, like Patent Literature 1, there has been provided with a dispensing mechanism having a rotational degree of freedom along two axes with respect to a horizontal movement, what is called, a structure of two-link arm.

Here, the conventional dispensing mechanism having two degrees of freedom will be described. FIG. 2 is a perspective view showing a state (a) before an arm is lowered and a state (b) after the arm is lowered. In the conventional dispensing mechanism of the two-link arm, a motor 28 is used to rotate a first shaft 26, thereby driving an inside arm 25, and a motor 33 is used to rotate a second shaft 31, thereby driving an outside arm 30. When lowering the arm, the first shaft 26 is lowered while rotating a rotary ball spline, and also the second shaft 31 is lowered while rotating a ball spline 55.

CITATION LIST

Patent Literature

[Patent Literature 1] Japanese Patent Laid-Open No. 2014-206381

SUMMARY OF INVENTION

Technical Problem

In the above conventional two link arm, however, when the arm is vertically moved, the whole second shaft is lowered and protrudes from the lower part of the base of the dispensing mechanism by the amount of descent. Therefore, a space is required below the base to avoid the protruding shaft, and the layout of the unit to be arranged below the dispensing mechanism is restricted. Alternatively, it would be necessary to shift the position of the dispensing mechanism to allow the shaft to protrude.

The invention aims to provide an automatic analyzer improved in the degree of freedom with respect to the arrangement of the dispensing mechanism and the unit provided below the above mechanism.

Solution of Problem

In order to achieve the above object, the invention provides an automatic analyzer having a dispensing mechanism driving a probe for a reagent or a specimen, in which an arm of two degrees of freedom supporting the probe; a first shaft and a second shaft that support the arm and transmit power to the arm; and a motor that gives power allowing the first and the second shafts to be rotated and vertically moved are provided, the second shaft is divided in an axial direction and have different diameters, and at the time of lowering the arm by the power of the motor, divided one of the second shaft is housed inside the other, whereby the second shaft is shortened.

Advantageous Effects of Invention

According to the invention, it is possible to provide an automatic analyzer improved in the degree of freedom with respect to the arrangement of a dispensing mechanism and a unit provided below the above, by avoiding a part of a shaft from protruding from the lower part of the dispensing mechanism or by decreasing the protruding amount.

BRIEF DESCRIPTION OF THE DRAWINGS

FIG. 2A is a perspective view showing a state before an arm is lowered, and 2B is a perspective view showing a state after the arm is lowered.

FIG. 6A is a sectional view showing a state before the arm is lowered, and FIG. 6B is a sectional view showing a state after the arm is lowered.

FIG. 7A is a schematic view showing a state of a shaft before the arm is lowered, and FIG. 7B is a schematic view showing a state of the shaft after the arm is lowered.

FIG. 8A is a schematic view showing a state of a shaft before an arm is lowered, and FIG. 8B is a schematic view showing a state of the shaft after the arm is lowered.

Description of Embodiments

Figure 1:
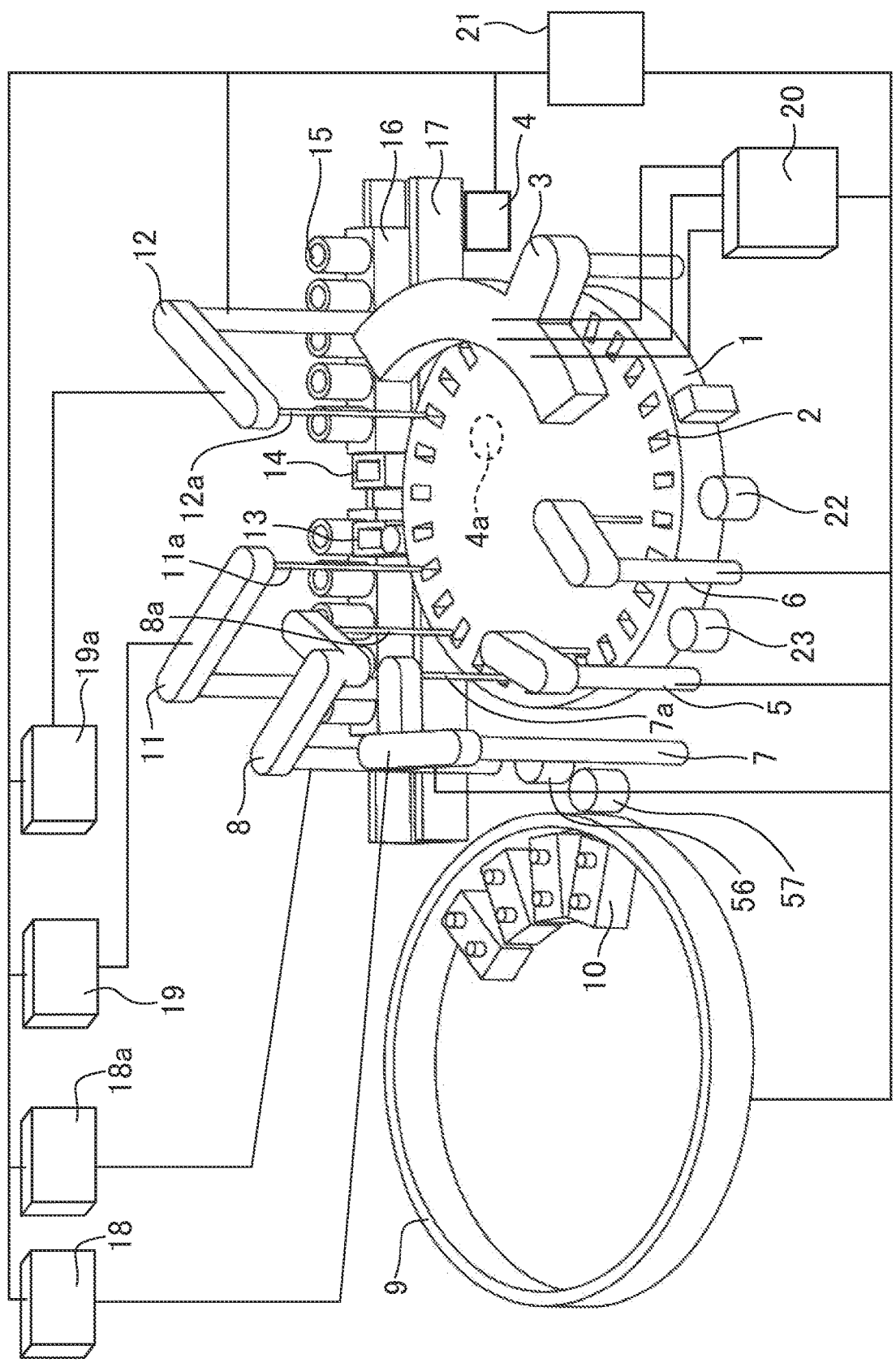
FIG. 1 is a view showing an entire configuration of an automatic analyzer.
Figure 2B:
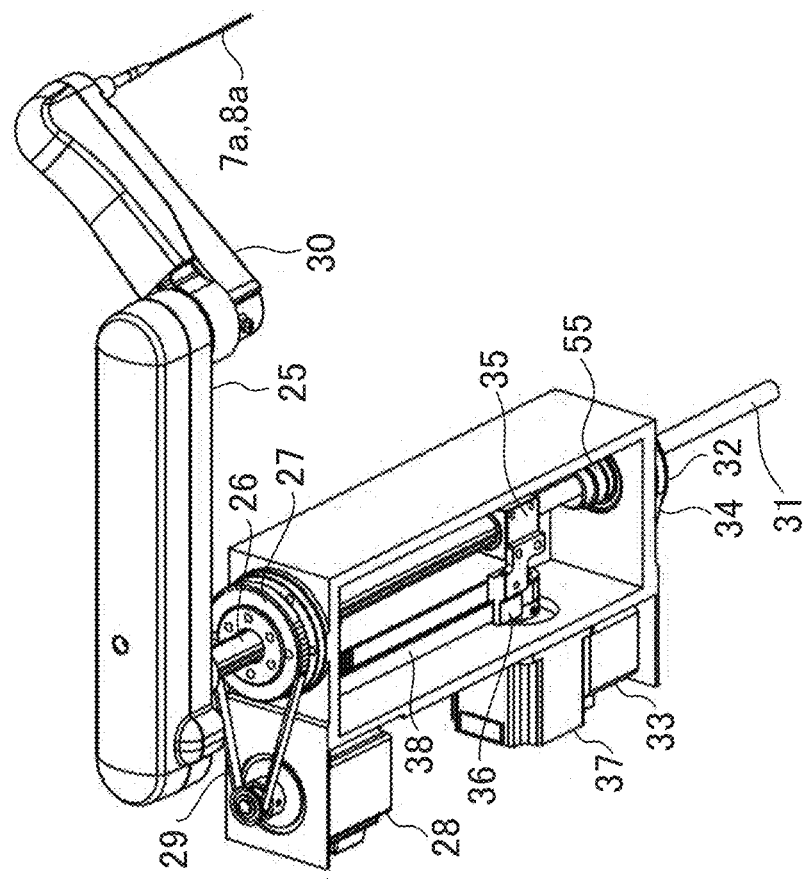
FIGS. 2A and 2B are perspective views wherein, regarding a dispensing mechanism in a conventional automatic analyzer.
Figure 2A:
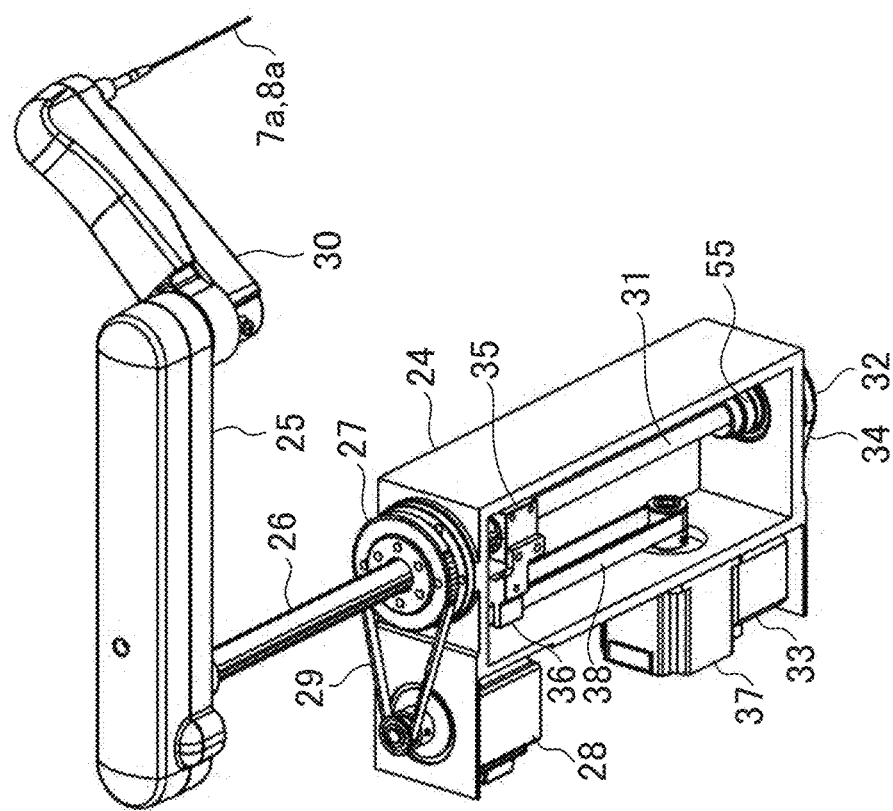

FIG. 1 is a perspective view showing an entire configuration of an automatic analyzer according to an embodiment. The automatic analyzer is a device in which a sample (specimen) and a reagent are dispensed in a plurality of reaction containers 2 to react with each other and the reacted liquid is measured. The automatic analyzer includes a reaction disk 1, a reagent disk 9, a specimen transport mechanism 17, reagent dispensing mechanisms 7 and 8, a syringe for reagent 18, specimen dispensing mechanisms 11 and 12, a syringe for specimen 19, a cleaning mechanism 3, a light source 4a, a spectrophotometer 4, stirring mechanisms 5 and 6, a pump for cleaning 20, cleaning tanks 13, 14, 22, 23, 56, and 57, and a controller 21.

Reaction containers 2 are aligned on the circumference of the reaction disk 1. The specimen transport mechanism 17 for transferring a specimen rack 16 with specimen containers (test tubes) 15 mounted thereon is arranged in the vicinity of the reaction disk 1. The specimen container 15 contains an inspection specimen such as blood and the like, which is mounted on the specimen rack 16 and carried by the specimen transport mechanism 17. The rotatable and vertically movable specimen dispensing mechanisms 11 and 12 are arranged between the reaction disk 1 and the specimen transport mechanism 17. The specimen dispensing mechanisms 11 and 12 have the respective specimen probes 11*a* and 12*a* with the syringes for specimen 19 and 19*a* connected, and the specimen probes 11*a* and 12*a* move along arc track around the rotation axes of the specimen dispensing mechanisms 11 and 12, to dispense the specimens from the specimen containers 15 to the reaction containers 2.

The reagent disk 9 can mount a plurality of reagent bottles 10 on its circumference. The reagent disk 9 is kept cool. Rotatable and vertically-movable reagent dispensing mechanisms 7 and 8 are arranged between the reaction disk 1 and the reagent disk 9. The reagent dispensing mechanisms 7 and 8 have the respective reagent probes 7*a* and 8*a* with the syringes for reagent 18 and 18*a* connected, and the reagent probes 7*a* and 8*a* move along arc around the rotation axes, get access to the reagent disk 9, and dispense the reagent from the reagent bottle 10 to the reaction container 2.

Around the reaction disk 1, there are arranged a cleaning mechanism 3 for cleaning the reaction container having been measured, stirring mechanisms 5 and 6 for stirring a mixed liquid (reaction liquid) of a reagent and a specimen within the reaction container, a light source 4*a* and a spectrophotometer 4 for irradiating the mixed liquid (reaction liquid) within the reaction container with light and measuring, for example, its absorbance. Further, a pump for cleaning 20 is connected to the cleaning mechanism 3. Cleaning tanks 13, 14, 57, 56, 23, and 22 are respectively provide in the range of the movement of the specimen dispensing mechanisms 11 and 12, the reagent dispensing mechanisms 7 and 8, and the stirring mechanisms 5 and 6. Each mechanism of the automatic analyzer is connected to the controller 21 and controlled.

Analysis processing of an inspection specimen by the automatic analyzer is generally executed according to the following steps. At first, a specimen within the specimen container 15 mounted on the specimen rack 16 which is carried near the reaction disk 1 by the specimen transport mechanism 17 is dispensed to the reaction container 2 on the reaction disk 1 according to the specimen probe 11*a* of the specimen dispensing mechanism 11. Next, a reagent to be used for analysis is dispensed from the reagent bottle 10 on the reagent disk 9 to the reaction container 2 in which the sample has been previously dispensed, according to the reagent probe 7*a* of the reagent dispensing mechanism 7 or the reagent probe 8*a* of the reagent dispensing mechanism 8. Continuously, the stirring mechanism 5 stirs the mixed liquid of the specimen and the reagent within the reaction container 2.

Then, the light generated from the light source 4*a* is transmitted through the reaction container 2 containing the mixed liquid, and the light intensity of the transmitted light is measured by the spectrophotometer 4. The light intensity measured by the spectrophotometer 4 is sent to the controller 21 through an A/D converter and an interface. The controller 21 calculates, for example, the concentration and the like of a predetermined component of the analysis item according to the reagent from the absorbance of the mixed liquid (reaction liquid). The obtained measurement results are displayed on a display unit (not shown) or the like. Although the explanation will be made by way of example of an automatic analyzer using the spectrophotometer 4 to require the concentration of a predetermined component, the technology disclosed in the embodiment described below may be used for an automatic immunological analyzer or an automatic coagulation analyzer that measures a sample using another photometer.

Figure 3:
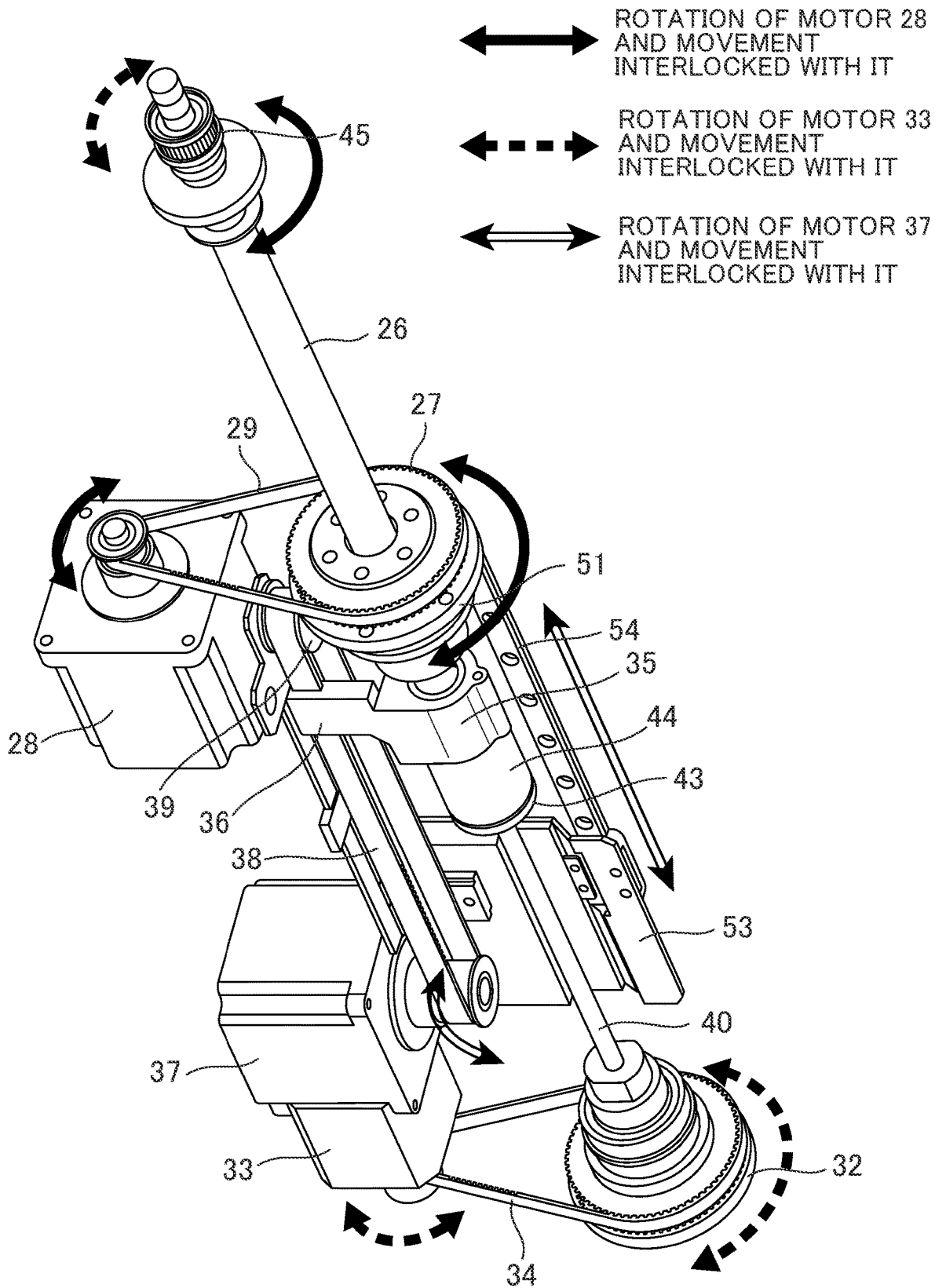
FIG. 3 is a perspective view wherein, regarding a dispensing mechanism according to an embodiment, an arm and a base are omitted.

FIG. 3 is a perspective view wherein, regarding the dispensing mechanism according to the embodiment, an arm and a base 24 are omitted. As shown in FIG. 3, the dispensing mechanism according to the embodiment has a first shaft 26 and a second shaft, as a shaft transmitting power to an arm while supporting the arm. The first shaft 26 is a rotation axis for rotating a first arm and the second shaft is a rotation axis for rotating a second arm. As described later, the second shaft is divided into an upper shaft 41 and a lower shaft 40 in an axial direction and they have different diameters.

At first, a structure for rotating the first arm through the first shaft 26 will be described.

To rotate the first arm, the power of the motor 28 is used. A pulley on the driving side built in the motor 28 is connected to a pulley 27 on the driven side through a belt 29, and the pulley 27 is further fixed to a rotary ball spline 51 (a sleeve portion 511 in FIG. 5). The rotary ball spline 51 as a ball spline for the first shaft slidably supports the first shaft 26 as a spline shaft and can transmit the torque of the pulley 27 to the first shaft 26. Therefore, the rotational power of the motor 28 is transmitted to the first shaft 26 through the belt 29, the pulley 27, and the rotary ball spline 51. When the arm moves vertically, the first shaft 26 slides onto the pulley 27 and the rotary ball spline 51, which enables the vertical movement of the first shaft 26. The pulley 27 on the driven side is reduced in speed by enlarging its diameter more than that of the pulley on the driving side, hence to be able to reduce the load due to the inertia at the rotation time of the first arm.

Next, a structure for rotating the second arm through the second shaft will be described.

To rotate the second arm, the power of the motor 33 is used. A pully on the driving side built in the motor 33 is connected to a pulley 32 on the driven side through a belt 34 and further the pulley 32 is fixed to the lower end of the lower shaft 40. The lower shaft 40 as the spline shaft is slidably supported by a ball spline 43 as a ball spline for the lower shaft. Here, the ball spline 43 is fixed to a joint 44, and further the joint 44 is fixed to the upper shaft 41 (refer to FIG. 5). Therefore, the rotation power of the motor 33 is transmitted to the upper shaft 41 through the belt 34, the pulley 32, and the lower shaft 40. Further, the pulley 32 on the driven side is reduced in speed by enlarging its diameter more than that of the pulley on the driving side, hence to be able to reduce the load due to the inertia at the rotation time of the second arm.

Next, a structure for vertically moving the first arm and the second arm through the shaft will be described.

To move each arm vertically, the power of the motor 37 is used. A belt 38 for vertical movement is endlessly wound around a pully on the driving side built in the motor 37 and a pulley 39 on the driven side. A joint 36 is fixed to the belt 38 connecting these two pulleys on the side of the same moving direction as the first shaft 26, and a balance weight 53 is fixed on the side of the moving direction opposite to the moving direction of the first shaft 26. The joint 36 is formed integrally with the slider 35. The balance weight 53 is to reduce the torque of the motor 37 required to drive the belt 38. When the joint 36 vertically moves according as the belt 38 is driven, the shaft (the lower shaft 40) works as a rail through the slider 35, which makes the joint 36 and the slider 35 smoothly move up and down. At this time, since the balance weight 53 moves vertically along a rail 54, the balance weight 53 can be moved up and down smoothly. When the joint 36, the slider 35, the first shaft 26, and the second shaft (the upper shaft 41) move up, the balance weight 53 gets down, while the joint 36 and the like get down, the balance weight 53 moves up.

Further, the slider 35 incorporates the bearing and restricts the position of the upper shaft 41 in the axial direction as for the first shaft 26, while rotatably supporting the first shaft 26 and the upper shaft 41. Therefore, when the motor 37 is driven, the first shaft 26 and the upper shaft 41 vertically move through the slider 35.

First Embodiment

Figure 4:
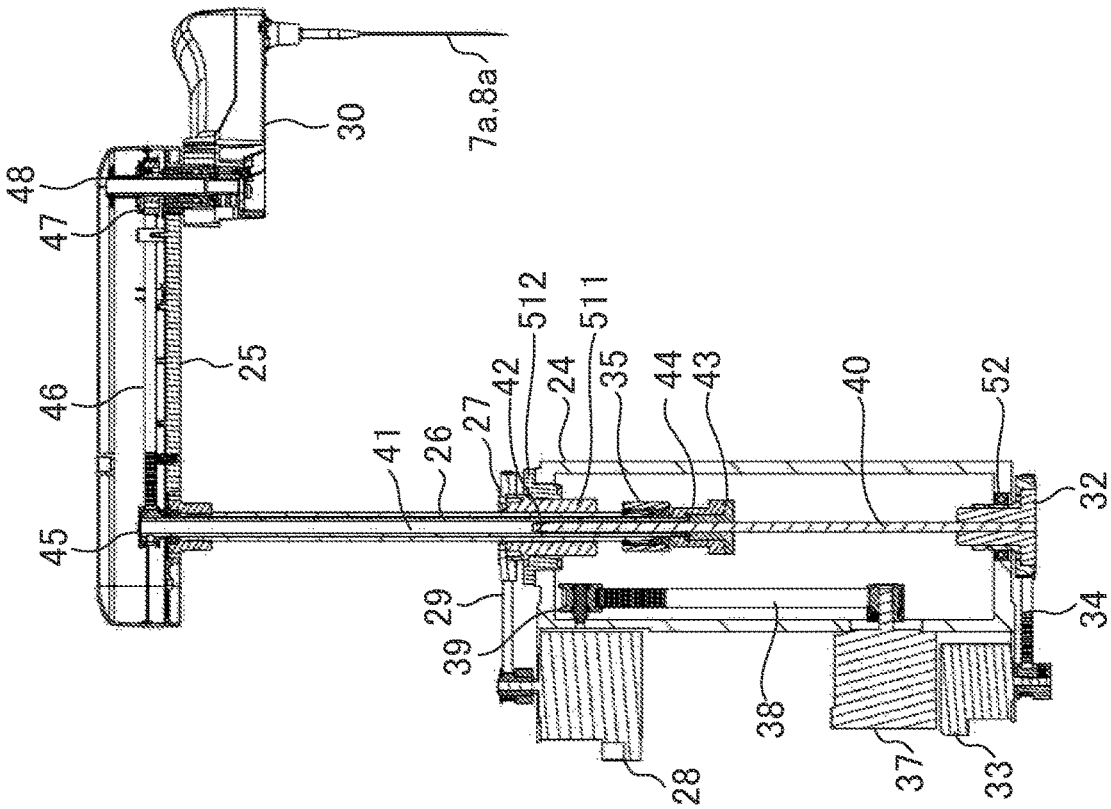
FIG. 4 is a front view of a dispensing mechanism according to an embodiment 1.
Figure 5:
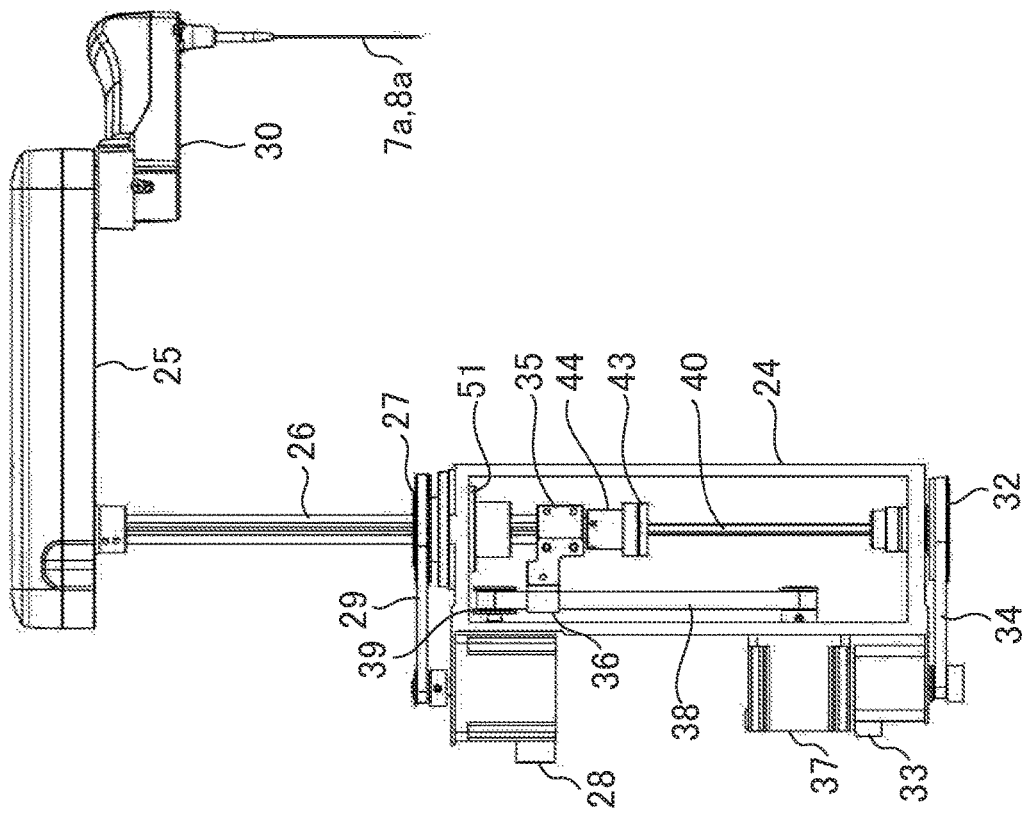
FIG. 5 is a sectional view of the dispensing mechanism according to the embodiment 1.

FIG. 4 is a front view of a dispensing mechanism according to the first embodiment and FIG. 5 is a sectional view of the dispensing mechanism according to the first embodiment. The dispensing mechanism according to the first embodiment includes an outside arm 30 as a second arm for supporting each of the reagent probes 7a and 8a and an inside arm 25 as a first arm connected to this outside arm 30, in a structure of 2-link arm capable of two-degree-of-freedom positioning. Although in this embodiment, the dispensing mechanism including each of the reagent probes 7a and 8a will be described, it is needless to say that it can be adopted to the dispensing mechanism including a specimen probe.

The dispensing mechanism according to the embodiment includes the inside arm 25 and the outside arm 30, further the base 24, the first shaft 26, the second shaft, the motor 28 for rotating the first shaft 26, the motor 33 for rotating the second shaft, and the motor 37 for vertically moving the first shaft 26 and the second shaft (the upper shaft 41). Then, the motor 28, the motor 33, and the motor 37 are fixed to the base 24.

As shown in FIG. 5, a pulley 45 within the inside arm 25 is attached to the upper end of the upper shaft 41 forming the second shaft. This pulley 45 rotates a pulley 47 through a belt 46 and a shaft 48 fixed to the pulley 47. This shaft 48 is joined to the outside arm 30. When the upper shaft 41 rotates, the outside arm 30 rotates with the distal end of the inside arm 25 as a rotation axis and each of the reagent probes 7a and 8a at the distal end of the outside arm 30 is positioned. Since the upper end of the first shaft 26 is connected to the inside arm 25, when the first shaft 26 rotates, the inside arm 25 is rotated.

In the embodiment, there are provided with the rotary ball spline 51 that supports the first shaft 26 slidably in a vertical direction regarding the base 24 and the ball spline 43 that supports the lower shaft 40 slidably in a vertical direction regarding the upper shaft 41. Here, the rotary ball spline 51 includes a cylindrical sleeve portion 511 fitted externally to the first shaft 26 as the spline shaft and a flange portion 512 arranged on the outer peripheral side of this sleeve portion 511 via the rotary bearing. Then, the upper side of the sleeve portion 511 is fixed to the pulley 27. Further, the flange portion 512 is used to fix the rotary ball spline 51 to a through-hole provided on the top of the base 24.

The outer diameter of the lower shaft 40 having a solid cross section horizontally is smaller than the internal diameter of the upper shaft 41 having a hollow cross section horizontally, so that the lower shaft 40 can be housed into the upper shaft 41 concentrically. When the arm operates downwardly, the lower shaft 40 does not move in an axial direction but the upper shaft 41 is lowered. Here, in the embodiment, since a bush 42 is arranged in the upper end of the lower shaft 40, a contact portion of the lower shaft 40 and the upper shaft 41 is restricted to the bush 42 and the ball spline 43. Therefore, when the arm operates downwardly, the upper shaft 41 can be lowered smoothly sliding along the lower shaft 40, and this can avoid a problem from occurring caused by a direct contact of the upper shaft 41 with the outer surface of the lower shaft 40. When the bush 42 is arranged, it is necessary to form a groove on the outer peripheral surface of the lower shaft 40; however, since this lower shaft 40 is solid, a decrease of strength can be suppressed even when the groove is formed.

In this embodiment, the lower shaft 40 is formed solid and the upper shaft 41 is formed hollow, hence to suppress an increase in diameter of the first shaft 26. When the lower shaft 40 is formed hollow and the upper shaft 41 is formed solid, the size in the diameter direction of the ball spline for the lower shaft is enlarged and the diameter of the first shaft 26 arranged outwardly is enlarged, which increases the total weight of the shaft.

However, when some increase in the diameter of the first shaft 26 is allowable, it does not preclude a structure in which the lower shaft 40 is formed hollow and the solid upper shaft 41 is housed into the lower shaft 40. Alternatively, when the upper shaft 41 and the lower shaft 40 are both formed hollow, a wire can be passed within the hollow shaft on the internal diameter side. Further, another shaft can be added on the outer diameter side of the first shaft 26, hence to increase the degree of freedom of positioning to three and more degrees.

In the embodiment, the pulley 27 for rotating the first shaft 26 is supported on the top of the base 24 through the rotary ball spline 51 and the pulley 32 for rotating the lower shaft 40 is supported on the bottom of the base 24 through the bearing 52. Since the tension by the belt 29 and the belt 34 respectively works on the pulley 27 and the pulley 32, the load is respectively applied to the side of the motor 28 and the side of the motor 33. The lower shaft 40 in the embodiment, however, has a length from the bottom to the top of the base 24 and the both ends are supported by the top and the bottom of the base 24. As the result, even when the load caused by the tension of the belt is added to the lower shaft 40 through the pulley, the position of the lower shaft 40 is hardly deviated. Further, the lower shaft 40 serves as a rail of the upper shaft 41 and the first shaft 26, which can avoid the upper shaft 41 and the first shaft 26 from inclining; as the result, it is possible to control the stopping position of each of the reagent probes 7a and 8a accurately.

The length of the lower shaft 40 may be longer in a way of protruding from the pulley 27; however, the longer shaft is increased in the processing cost, and therefore, the upper end of the lower shaft 40 is positioned within the range of the axial direction of the rotary ball spline 51. Particularly, in the embodiment, the upper end of the lower shaft 40 is positioned within the range of the axial direction of the flange portion 512 of the rotary ball spline 51, which improves the strength of the whole dispensing mechanism. When the lower shaft 40 is short, in other words, when the upper end of the lower shaft 40 is positioned lower than the lower end of the rotary ball spline 51, the upper end of the lower shaft 40 easily deviates and the upper shaft 41 and the first shaft 26 may be inclined. In this case, there is a fear that the lower shaft 40 and the upper shaft 41 may be bent at the position of the slider 35, resulting in a resistance in the vertical movement of the arm and an increasing abrasion of the shafts.

FIG. 6 is a cross-sectional view showing a state (a) before the arm is lowered and a state (b) after the arm is lowered in the dispensing mechanism according to the embodiment.

Figure 6A:
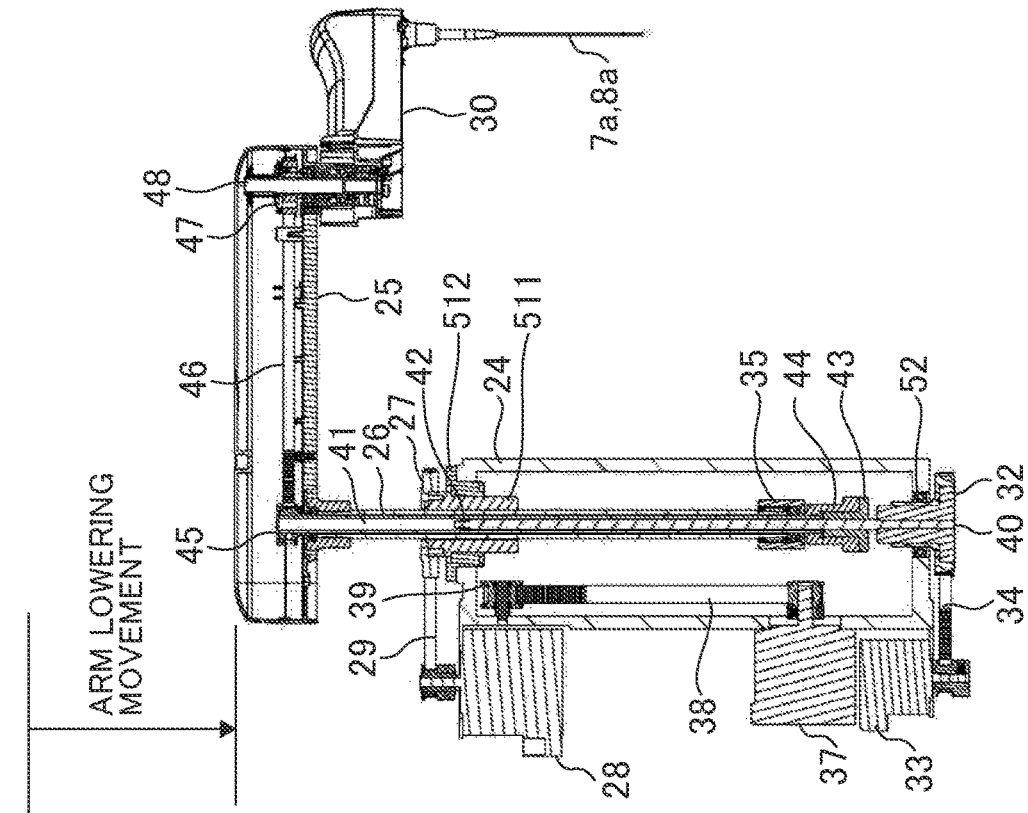
FIGS. 6A and 6B are sectional views wherein, regarding the dispensing mechanism according to the embodiment 1.
Figure 6B:
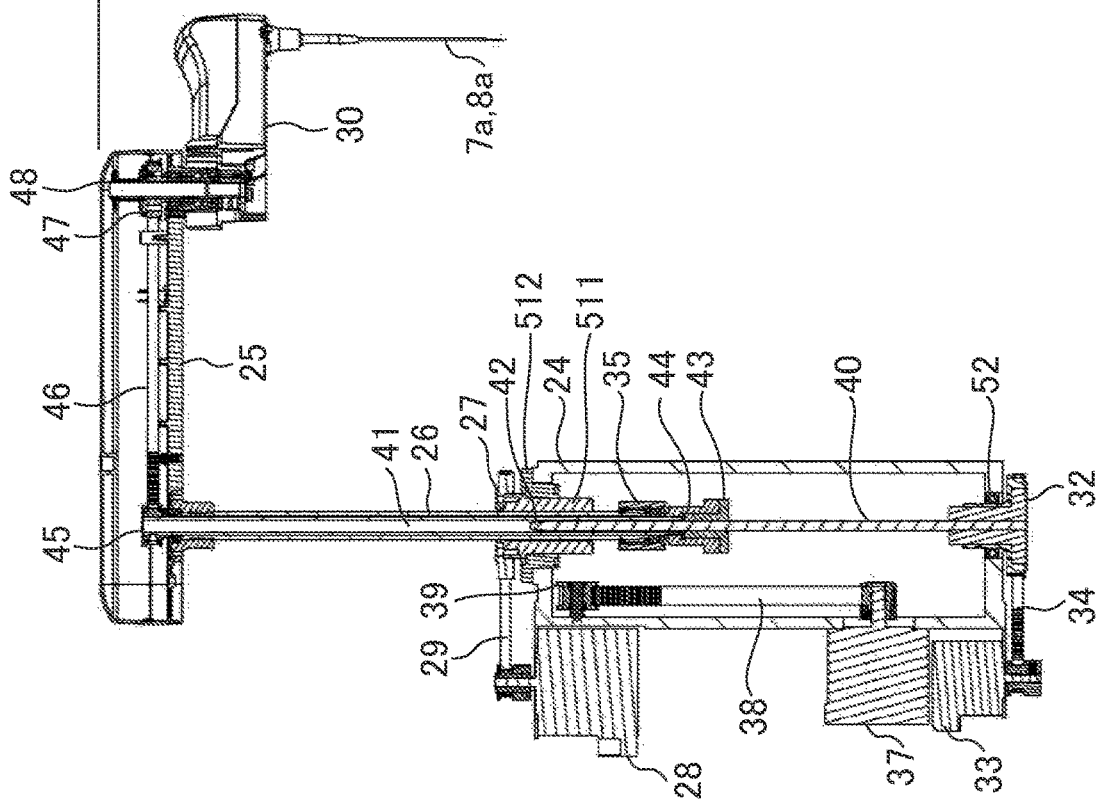

As shown in FIG. 6(a), when the inside arm 25 and the outside arm 30 are positioned upwardly, the second shaft is extended, and the first shaft 26 and the upper shaft 41 of the second shaft are positioned upwardly from the lower shaft 40 of the second shaft. On the contrary, as shown in FIG. 6(b), when the inside arm 25 and the outside arm 30 are positioned downwardly, the second shaft is shrunk and the first shaft 26 and the upper shaft 41 are positioned relatively lower than the state (a) in FIG. 6.

Next, an operation of lowering the first shaft and the second shaft by the motor 37 in the dispensing mechanism according to the embodiment will be specifically described. FIG. 7 is a schematic view showing a state (a) of the shafts before the arm is lowered and a state (b) of the shafts after the arm is lowered in the dispensing mechanism according to the embodiment.

Figure 7A:
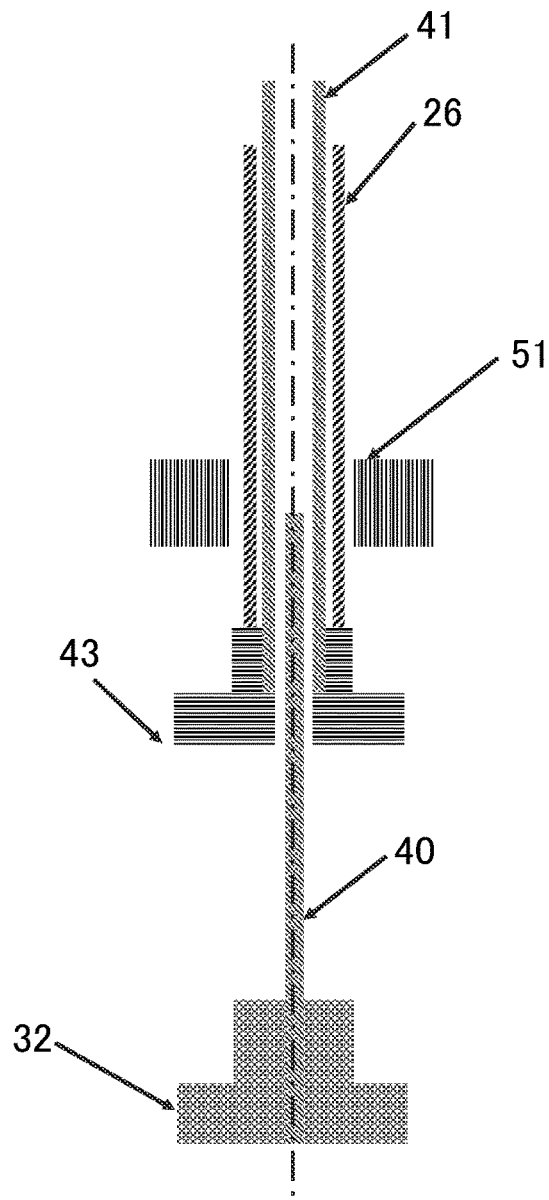
FIGS. 7A and 7B are schematic views wherein, regarding the dispensing mechanism according to the embodiment 1.

Before the arm is lowered, as shown in FIG. 7(a), the first shaft 26 and the upper shaft 41 are positioned upwardly. Then, when the motor 37 is driven, the first shaft 26 is lowered while sliding on the rotary ball spline 51. Here, the first shaft 26 is restricted to the position in the axial direction with respect to the upper shaft 41; therefore, when the first shaft 26 is lowered, the upper shaft 41 is also lowered together with the ball spline 43.

Figure 7B:
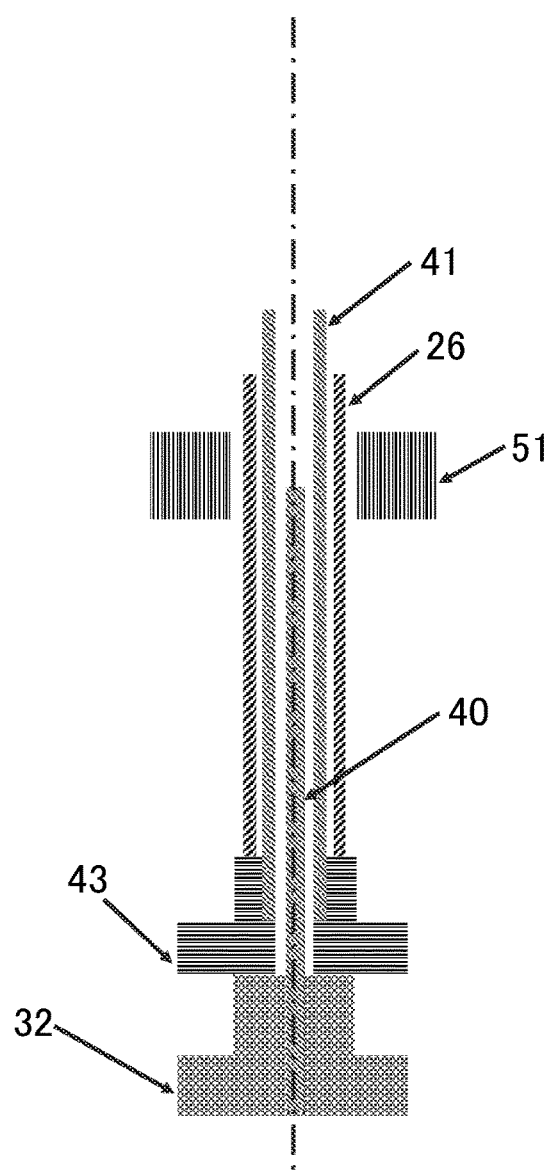

At this time, the ball spline 43 is lowered sliding along the lower shaft 40. Then, as shown in FIG. 7(b), the first shaft 26 and the upper shaft 41 move downwardly relatively to the lower shaft 40, the lower shaft 40 having a smaller diameter is gradually housed into the hollow upper shaft 41 having a larger diameter, and when the length of the second shaft is shortened, the downward operation of the arm is finished. Here, the lower end of the lower shaft 40 is fixed to the base 24 together with the pulley 32, to restrict the position in the axial direction. Therefore, in the embodiment, no part of the second shaft is protruded from the bottom of the base 24 and the bottom space of the base 24 can be effectively availed. As the result, downsizing and high performance of the automatic analyzer can be realized. The embodiment adopts a structure in which the lower end of the second shaft is not lowered even when the upper end of the second shaft is lowered, in other words, in which the second shaft is not protruded from the bottom of the base 24; however, as far as a protruding portion can be smaller by shortening the length of the second shaft, some effect can be achieved.

On the contrary, as a comparison example, an operation of the dispensing mechanism having one second shaft without being divided will be described. FIG. 8 is a schematic view showing a state (a) of the shaft before the arm is lowered and a state (b) of the shaft after the arm is lowered, in the dispensing mechanism of the comparison example.

Figure 8A:
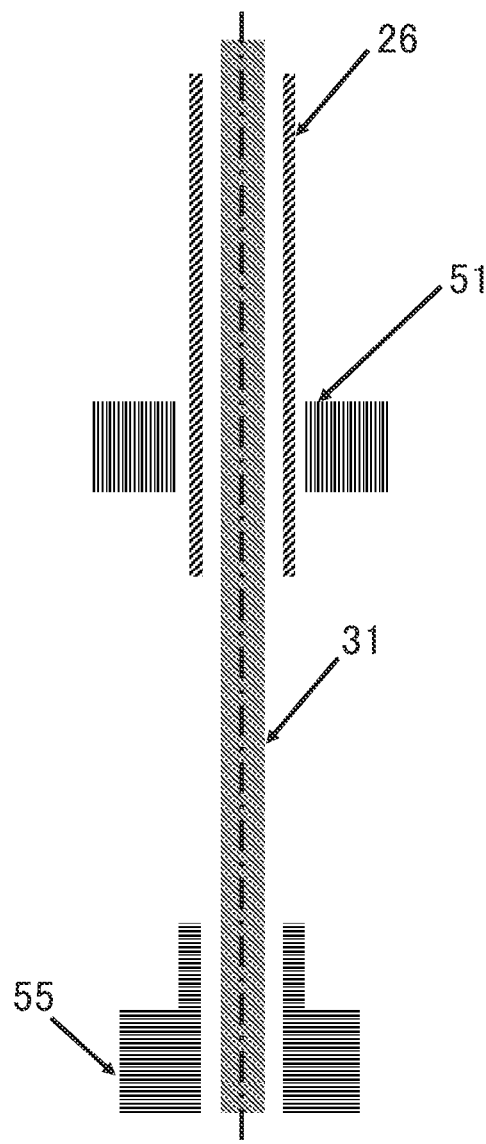
FIGS. 8A and 8B are schematic views, wherein regarding a dispensing mechanism according to a comparative example.

Before the arm is lowered, as shown in FIG. 8(a), the first shaft 26 and the second shaft 31 are positioned upwardly. Thereafter, when the motor is driven, the first shaft 26 moves down while slidably moving the rotary ball spline 51. Here, the first shaft 26 is restricted to the position in the axial direction with respect to the second shaft 31; therefore, when the first shaft 26 moves down, the second shaft 31 also moves down.

Figure 8B:
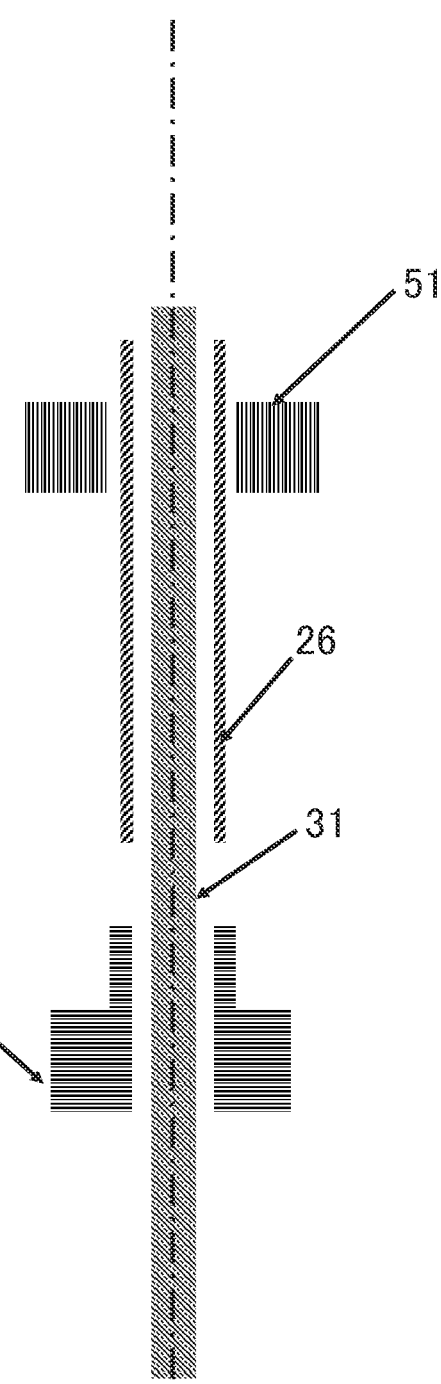

At this time, the second shaft 31 moves down while slidably moving the ball spline 55 at the bottom of the base 24. Therefore, as shown in FIG. 8(b), a part of the second shaft 31 is protruded from the bottom of the base 24 and the bottom space of the base 24 is restricted.

Second Embodiment

The first embodiment is designed in that the outside arm 30 as the second arm is connected to the distal end of the inside arm 25 as the first arm and that each of the reagent probes 7a and 8a is mounted to the distal end of the outside arm 30. Therefore, it is possible to achieve the positioning at one stopping position with two degrees of freedom. On the other hand, in a second embodiment, arms each having one degree of freedom are vertically mounted in two stages and each arm can be rotated independently according to the first shaft and the second shaft.

Figure 9:
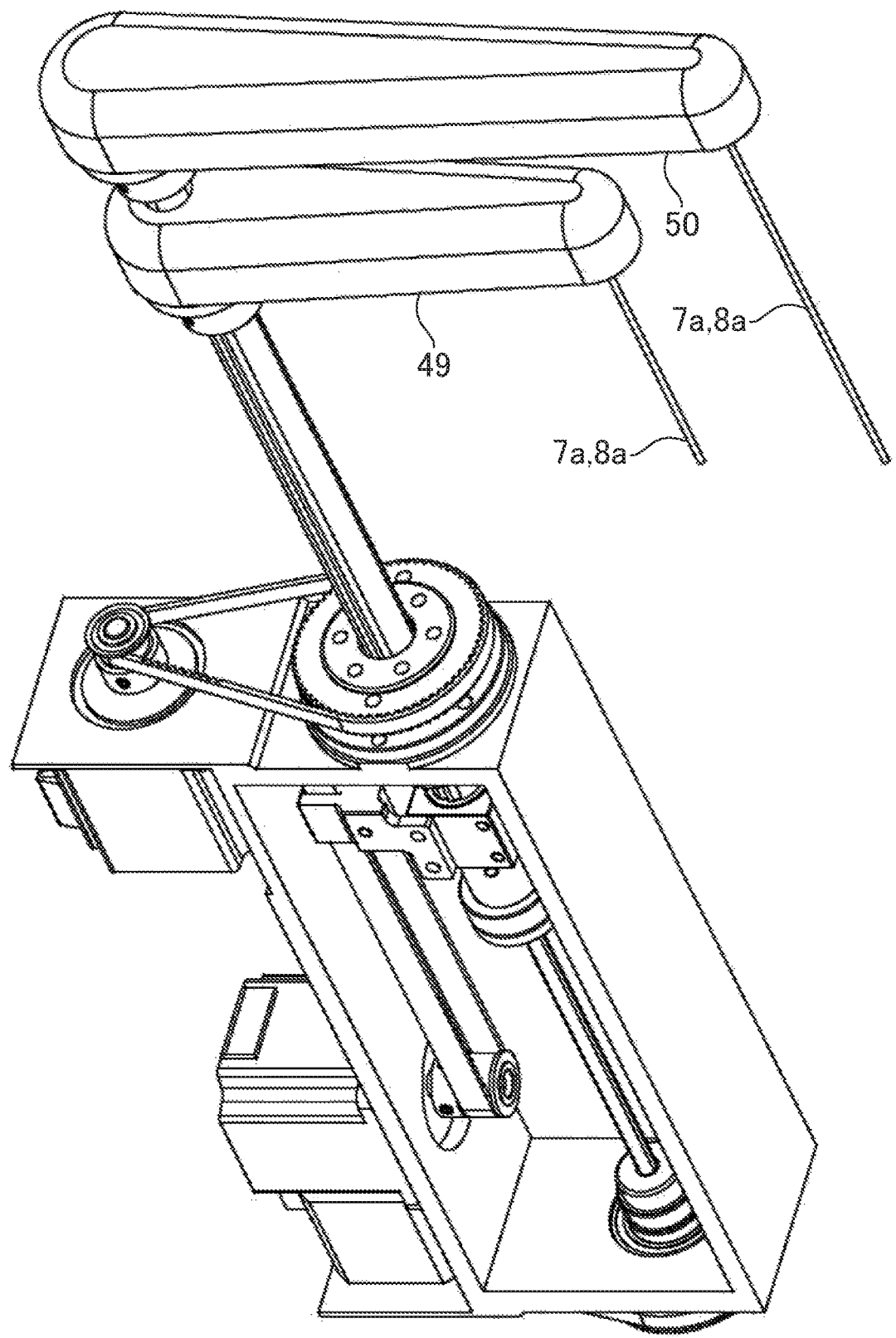
FIG. 9 is a perspective view of a dispensing mechanism according to an embodiment 2.

FIG. 9 is a perspective view of a dispensing mechanism according to the second embodiment. As shown in FIG. 9, the dispensing mechanism according to this embodiment has two reagent probes 7a or 8a. The lower stage arm 49 as the first arm is rotated to position the reagent probe according to the first shaft 26, and the upper stage arm 50 as the second arm is rotated to position the reagent probe according to the second shaft (the upper shaft 41 and the lower shaft 40). The reagent probes 7a or 8a are respectively mounted to the distal ends of the arms, and the lower stage arm 49 and the upper stage arm 50 are vertically moved in the same way at the same time and can be rotated independently at the same time. Since the arms are divided vertically in the two stages, the reagent probe 7a or 8a of the upper stage arm 50 is longer than the reagent probe 7a or 8a of the lower stage arm 49 so that the distal end of the reagent probe 7a or 8a of the upper stage arm 50 may be positioned at the same height as that of the lower stage arm 49.

According to the embodiment, it is possible to realize an automatic analyzer having a two degree of freedom arm that can set the two positions at the same time and that can dispense an object at the two positions at the same time. Further, since a single dispensing mechanism can dispense an object at two positions at the same time, the number of the dispensing mechanisms in the automatic analyzer can be reduced.

In addition, by adding a hollow shaft, the degree of freedom in the positioning can be increased. For example, when two hollow shafts are added and another arm is connected to each of the distal ends of the lower stage arm 49 and the upper stage arm 50, it is possible to position each probe not only with the two degrees of freedom but also at the two positions at the same time, hence to improve the accuracy of the stopping position.

The above mentioned first and second embodiments are described in detail to explain the invention for easy understanding, and are not necessarily limited to those having all the described components. It is also possible to replace a part of the components of one embodiment with the other component of the other embodiment and to add a component of one embodiment to the components of the other embodiment. Further, it is also possible to add, delete, or replace some of the components of each embodiment to, from, or with the other components or component.

LIST OF REFERENCE SIGNS

1: Reaction disk
2: Reaction container
3: Cleaning mechanism
4: Spectrophotometer
4a: Light source 5, 6: Stirring mechanism
7, 8: Reagent dispensing mechanism
7a, 8a: Reagent dispensing probe
9: Reagent disk
10: Reagent bottle
11, 12: Specimen dispensing mechanism
11a, 12a: Specimen probe
13, 14: Cleaning tank (for specimen dispensing mechanism)
15: Specimen container (Test tube)
16: Specimen rack
17: Specimen transport mechanism
18, 18a: Syringe for reagent
19, 19a: Syringe for specimen
20: Pump for cleaning
21: Controller
22, 23: Cleaning tank (for stirring mechanism)
24: Base
25: Inside arm
26: First shaft
27: Pulley
28, 33, 37: Motor
29, 34, 38, 46: Belt
30: Outside arm
31: Second shaft
32, 39, 45, 47: Pulley
35: Slider
36, 44: Joint
40: Lower shaft
41: Upper shaft
42: Bush
43: Ball spline
48: Shaft
49: Lower stage arm
50: Upper stage arm
56, 57: Cleaning tank (for reagent dispensing mechanism)

What is claimed is:

1. A dispensing mechanism having a probe for a specimen or a reagent for use in an automatic analyzer, the dispensing mechanism, comprising:
   a first arm and a second arm an arm of two degrees of rotational freedom supporting the probe;
   a first shaft and a second shaft that support the first arm and second arms and transmit power to the first and second arms;
   a plurality of motors that provide power allowing the first and second shafts to be rotated and vertically moved, the plurality of motors including a first motor configured to rotate the first shaft, a second motor configured to rotate the second shaft, and a third motor configured to vertically move the first shaft and the second shaft; and
   a base that supports a lower end of the second shaft,
   wherein the second shaft is divided in an axial direction in an upper shaft and a lower shaft having different diameters,
   upon lowering of the first and second arms by the power of the third motor, the upper shaft and lower shaft are housed inside the other, whereby the second shaft is shortened,
   wherein the upper shaft is disposed within the first shaft, and
   wherein the second motor that provides power to rotate the second shaft is disposed on a lateral side of the base.

2. The dispensing mechanism according to claim 1, wherein even if an upper end of the second shaft is lowered, a lower end of the second shaft is not lowered.

3. The dispensing mechanism according to claim 1, wherein the upper shaft is hollow in horizontal cross section and the lower shaft is solid in horizontal cross section.

4. The dispensing mechanism according to claim 1, wherein the first and second shafts are spline shafts, wherein the lower end of the lower shaft is supported by the base, and
wherein the automatic analyzer further comprises:
   a first ball spline for the first shaft vertically slidably supporting the first shaft with respect to the base; and
   a second ball spline for the lower shaft vertically slidably supporting the lower shaft with respect to the upper shaft.

5. The dispensing mechanism according to claim 4, wherein an upper end of the lower shaft is located within an axial directional range of the first ball spline for the first shaft.

6. The dispensing mechanism according to claim 1, wherein the first arm and the second arm rotate independently based on the first shaft and the second shaft, respectively.

7. The dispensing mechanism according to claim 1, wherein the first motor for the first shaft rotation that provides power to rotate the first shaft is arranged on the lateral surface of the base, and
wherein the third motor for shaft vertical movement that provides power to move the first shaft and the second shaft vertically through a belt is arranged on the lateral surface of the base between the first motor for the first shaft rotation and the second motor for the second shaft rotation.

* * * * *